Dec. 19, 1933.                G. E. BAXTER                1,939,947
                   COLOR FILM AND METHOD OF MAKING SAME
                              Filed Feb. 13, 1931
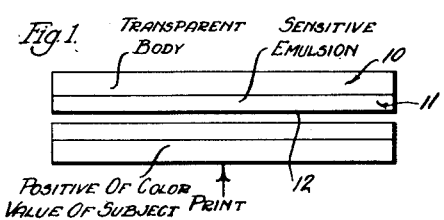
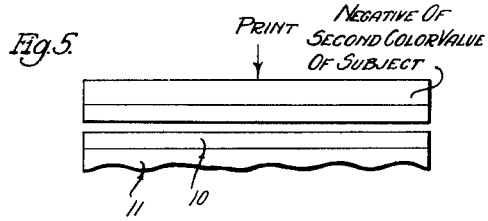
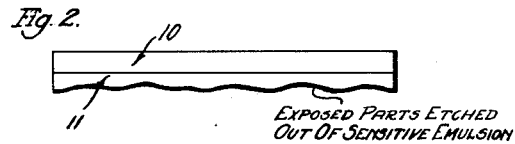
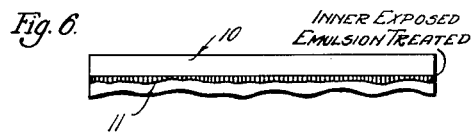
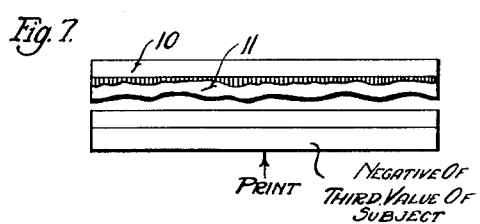
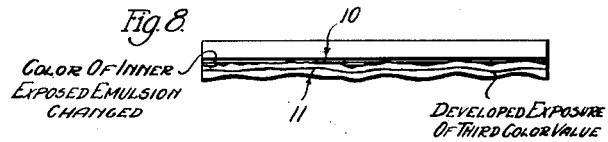
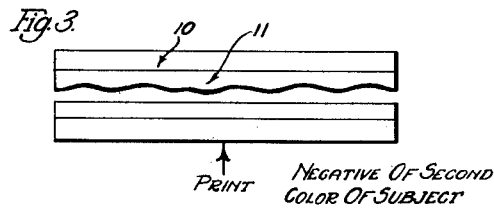
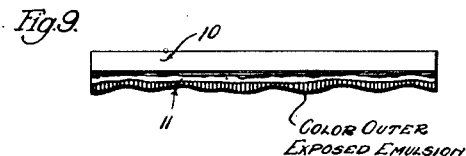
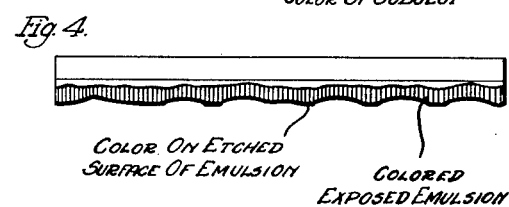
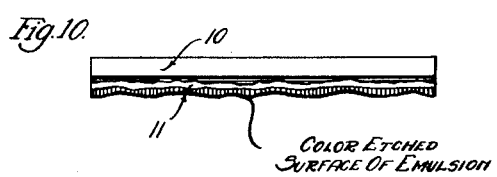
Inventor
GEORGE E. BAXTER
by
his Attorney Patented Dec. 19, 1933

1,939,947

UNITED STATES PATENT OFFICE 1,939,947

COLOR FILM AND METHOD OF MAKING SAME

George E. Baxter, Los Angeles, Calif.

Application February 13, 1931. Serial No. 515,489

17 Claims. (Cl. 95—2)

This invention relates to a color film and method of making the same; and it is an object of the invention to provide a simple, effective, and commercially practical film carrying an image in color, and to provide a simple, inexpensive, and practical method of producing such film.

Various methods have been developed and perfected for producing film or pictures of different color values of a subject simultaneously and from a common point of vision. In some instances, the color values of the subject being photographed are divided into two groups of values, in which case two films are produced carrying different color values of the subject; while, in other cases, the color values of the subject are divided into three groups of values, in which case three films are produced carrying different color values of the subject.

It is an object of this invention to produce a film from a plurality of separate films, each carrying images of different color values of a subject, which film is colored so that an image projected from it is colored like the original subject.

It is another object of this invention to provide a film in which the body of emulsion has on its outer surface an etched image, the emulsion being sensitive and adapted to receive further exposures.

It is a further object of the present invention to provide a film, the emulsion of which carries in register three images, each of a different color value of a subject, two of the images being embedded in the emulsion from opposite sides, and the third image being etched in the outer surface of the emulsion.

It is another object of this invention to provide a method of treating a film to provide an etched image in the emulsion of the film, leaving the emulsion sensitive and capable of exposure and development.

A further object of the invention is to provide a simple, commercially practical method of etching the emulsion of a film, printing on the emulsion of the film, and coloring the images carried by the emulsion to produce a colored picture of a subject.

Other objects and features of the invention will be best and more fully understood from the following detailed description of typical preferred forms of the invention and the manner of carrying out the invention, throughout which description reference will be had to the accompanying drawing, in which:

Figs. 1 and 2 are diagrammatic views illustrating the production of a film having a sensitive emulsion, the surface of which has an etched image. Figs. 3 and 4 are diagrammatic views illustrating the production of a colored image in the emulsion and the coloring of the etched image, and Figs. 5 to 10, inclusive, are diagrammatic views illustrating the production of two different colored images in the emulsion and the coloring of the etched image on the surface of the emulsion.

The present invention is concerned primarily with a film and a method of treating or handling a film. In carrying out the invention, I employ film carrying images of different color values of a subject taken simultaneously and from a common point of vision. In some cases, the color values of a subject may be divided and may be carried on two films, while in other cases they may be divided and carried on three films.

This invention is particularly suitable and valuable as applied to the production of motion pictures in color; and, therefore, throughout this disclosure, the invention will be described as applied to this particular branch of photography.

The film stock employed in carrying out the invention is preferably what is known as "positive" stock, which film has the usual body 10 of celluloid, or other transparent material, and an emulsion 11 on one face of the body. It is preferred that the emulsion 11 have in it a certain amount of dye to act as a gradual filter; for instance, for the purpose of carrying out the invention as hereinafter described, it is preferred that the emulsion carry a yellow or orange-yellow dye. Motion picture film having emulsion dyed in the manner that I prefer is well known to those skilled in the art and is produced by the Eastman Kodak Company, being known as "duplicating" stock. To produce a dyed emulsion such as I refer to, ordinary positive stock may be treated with a solution of tartrazine and water in about the proportion of five grams of tartrazine to one liter of water. The degree of concentration of this solution may be varied. By increasing the concentration or strength of the solution, the light-filtering or resisting value of the emulsion is increased.

To provide the etched image in accordance with my present invention, a film carrying a positive image of certain color values of a subject is employed in printing onto the emulsion 11 from its outer surface 12. This step is illustrated diagrammatically in Fig. 1 of the drawing. The depth of printing into the emulsion is governed so that the exposure does not penetrate the full depth of the emulsion. In practice, suitable color filters, for instance, blue or violet filters, may be employed during printing to control the depth of exposure. Following exposure, the exposed film is subjected to an ordinary developer and, when the desired development has taken place, the film is washed thoroughly to remove all traces of this developer. If desired, the action of the developer may be arrested when necessary by bathing the film in an arresting, or acid bath, solution: for example, a weak solution of glacial acetic acid.

Following exposure and development, the film is subjected to an etching solution for the purpose of removing the exposed silver and the gelatine of the emulsion in immediate contact with the exposed silver. In practice, I have found it practical to employ a solution of Hydrogen peroxide ($H_2O_2$) 30 cc; Copper sulphate ($CuSO_4$) 20 grams; Nitric acid ($HNO_3$) 5 cc; Potassium bromide (KBr) 0.5 grams; Water ($H_2O$) 1 liter. Upon exposure of the developed film to a solution such as I have just specified for a period of about five minutes, the exposed silver and the gelatine in immediate contact with it will be disengaged or removed from the rest of the emulsion and taken up by the solution. The film is then removed from the solution just referred to, is washed, and is then dried, these operations being carried out in the dark, or in non-actinic light, so that the film is not exposed to light. The etched emulsion is illustrated diagrammatically in Fig. 2 of the drawing.

The film is now as it was originally, i. e., the emulsion remaining on the body 10 is sensitive and subject to receiving images, except that the surface 12 of the emulsion, instead of being smooth or plain as it was originally, is etched or has etched in it the image on the film employed in printing onto the emulsion. It is a particular and outstanding feature of this invention that the emulsion 11 remaining after the surface 12 has been etched is sensitive and such that it can be utilized in the production of further images.

The etched sensitive film produced by the present invention, as above described, may be employed in the production of images in color: for instance, one or more prints or images may be made in the sensitive emulsion and suitably dyed or colored, while the etched surface of the emulsion may be colored as by contacting it with a surface or body carrying a suitable dye. By contacting the etched surface of the emulsion with a surface carrying a suitable dye, a dyed image is produced on the film corresponding to that on the film used in the initial printing onto the emulsion.

To facilitate an understanding of the manner in which the film may be employed and to further set forth the invention, I will describe handling the film for the production of two-color images and will then describe it for three-color images.

For the production of an image employing two colors, i. e., in the case of a two-color process, a positive film of one color value, say, the blue color values of a subject, is employed in making the initial exposure on the emulsion 11 from the surface 12. This step is illustrated diagrammatically in Fig. 3 of the drawing. Following this exposure, the film is developed and, in accordance with the procedure above described, is washed and subjected to the etching solution which removes the developed silver and gelatine in immediate contact with it, leaving a relief image or etched image of the blue values of the subject on the surface of the emulsion 11. Following washing and drying of the etched film, a print is made onto the emulsion from either side through a negative film carrying other color values, say, the orange-red values of the subject, the image just referred to being of the same subject as that on the film first mentioned and being taken simultaneously with the film first mentioned and from a common point of vision, it being understood that the print or exposure being made through the negative image of the orange-red values is carefully registered with the image etched on the emulsion. Following the exposure or printing onto the etched emulsion, the film is developed, fixed, washed, and then dried in the manner ordinarily employed in handling film of this character. A suitable orange-red dye may then be mordanted to the reduced silver in the gelantine; and, while the gelatine is still soft or moist, the etched surface 12 is rolled or otherwise brought in contact with a body or surface of a suitable dye, say, a blue-green dye, so that the dye is imbibed by the relief surface.

The contacting of the etched surface of the emulsion with the dye-carrying surface is done so that the dye is taken only by the elevated parts of the surface and does not reach or is not taken up by the etched out parts. In practice, when employing ordinary duplicating stock such as I have referred to above, any suitable red-orange dye may be employed to dye or mordant the reduced silver in the emulsion 11, while any suitable blue-green dye may be employed to dye the etched images on the emulsion 11. In practice, I have employed Safranine, or a mixture of Rhodamine and Chrysoidine, for an orange-red, and I have used a mixture of Mythelene blue and Naphthol green for the blue-green dye. It will be obvious that, by proper regulation of the operations that I have described, i. e., by properly regulating the etching operation, the printing, and the application of the dyes, an image may be produced which, when projected, appears in colors like those of the original subject. The film produced as just described is illustrated diagrammatically in Fig. 4 of the drawing.

In the case of the application of three images or three colors to the film, the initial printing onto the surface 12 of the emulsion 11 is through a positive film of one color value, say, a yellow printing negative, or one taken through a violet filter. Following this first printing or exposure, the film is developed, washed clean of developer, and then subjected to the etching bath for a suitable period, say, from five to ten minutes, following which it is again washed and then dyed, as by a Tartrazine solution, so that it will act as a gradual filter in the case of subsequent exposures.

A second film carrying a negative image of another color, say, a blue printing film or one taken through an orange filter, is then registered with the etched image and a print is made through the back or the body 10 of the film onto the inner or body side of the emulsion 11. This step is illustrated diagrammatically in Fig. 5. This exposure or image is preferably developed in an amidol developer, although other ordinary developers may be employed. Following the development of the image at the inner side of the emulsion 11, the film is washed and treated to make the developed silver of the inner image subject to being colored by a developer used in developing the next or last exposure, or by a special toning solution, without being further developed by such developer or toning solution: for instance, the film may be placed in a copper toning solution until the reduced silver in the emulsion is toned to a copper red. The copper-toned image is illustrated diagrammatically in Fig. 6. A satisfactory copper toning bath may be made from:

| | |
|---|---|
| Cupric sulphate | 16 grams |
| Ammonium citrate | 52 grams |
| Potassium ferricyanide | 16 grams |
| Water | 1 liter |

Following the toning of the developed silver, the film is again washed and is then dried in the dark, leaving the remaining parts or unexposed portions of the emulsion 11 sensitive.

A third negative film of other color values, say, a red printing film or one taken through a green filter, is registered with the images already on the film and a print is made on the emulsion from the outer or etched side of the emulsion. This step is illustrated diagrammatically in Fig. 7. This print or exposure of the emulsion is developed in a developer containing iron: for instance, in a ferrous oxalate developer, this developer being used on the outer exposure acts on the toned developed image of the inner exposure and colors it, at least partially, to the desired blue. To complete the coloring of the inner developed image, the film is washed in water to remove the ferrous oxalate developer and is then subjected to a solution of

| | |
|---|---|
| Ferrous sulphate | 10 grams |
| Water | 1 liter |
| Sulphuric acid (10% solution) | 5 cc |

The treatment of the film in the solution just mentioned for a few minutes will convert the previously copper-toned blue image to an iron image which is blue, this occurring without in any way affecting the reduced silver of the image printed on the emulsion from the outer or etched side. The condition of the film at this point is illustrated diagrammatically in Fig. 8. The film is now treated in a suitable fixing bath and, after being washed, is placed in a mordanting bleach, say, for instance, a solution of

| | |
|---|---|
| Potassium ferricyanide | 1.30 grams |
| Chromic acid | .35 grams |
| Glacial acetic acid | 50 cc |
| Water | 1 liter |

The film is subjected to this latter solution until bleached, after which it is washed and placed in a solution of a red basic dye, say, for instance, Rhodamine, until the desired red values are obtained, whereupon it is washed to clear the high lights. This step is illustrated diagrammatically in Fig. 9.

While the film is still moist from the operations just described, or, after it has been dried and again moistened, it is rolled in contact with a surface or a body of, or carrying, suitable yellow dye, say, Tartrazine, such as will be imbibed by the elevated parts of the emulsion surface to color the etched image on the emulsion surface.

The film resulting from the treatment just described is illustrated diagrammatically in Fig. 10 and carries the three registering or superimposed images, each of a different color value of a common subject and each colored to correspond to the color value of which it is an image, with the result that by projection of the film an image of the subject in natural colors is obtained.

It is to be understood that I have, in describing my invention, made particular reference to but two typical examples thereof, and have referred to certain specific steps of treatment and solutions in order to facilitate an understanding of the principles of the invention. It will be obvious that the invention is capable of modification and variation; and it is therefore to be understood that it is not to be construed as limited to the specific details hereinabove set forth, but is to be construed as including various modifications, variations, and changes, as may appear to those skilled in the art and fall within the scope of the following claims:

Having described my invention, I claim:

1. A film including a body, and an emulsion on one face of the body, the outer face of the emulsion having a photographic image in relief, the emulsion being sensitive.

2. A film including a transparent body, and an emulsion on one face of the body, the outer face of the emulsion having an image of a color value of a subject in relief, the emulsion being sensitive to receive an exposure of an image of another color value of the subject.

3. A film including a body, and an emulsion on one face of the body, the outer face of the emulsion having a picture image in relief, the emulsion being sensitive and carrying a light-filtering dye.

4. A film including a body, an emulsion on the body having a colored image in it and having an image on its face in relief, and color on the elevated parts of the relief image the relief image being colored differently than the first mentioned image.

5. A film including a transparent body, emulsion on the body having exposed parts in it from each side, the exposed parts being of different colors, and an image on the emulsion in relief, the relief image being colored differently than said exposed parts.

6. A film including a transparent body, emulsion on the body having exposed parts in it from each side, the exposed parts being of different colors, and an image on the outer surface of the emulsion in relief, the relief image being colored differently than said exposed parts.

7. A film including a body, and an emulsion on one face of the body, the outer face of the emulsion having a picture image in relief, the emulsion being sensitive and being such as to act as a filter.

8. The method of treating a photographic emulsion having a body carrying a light sensitive medium which includes, printing onto one face of the photographic emulsion, developing the exposed parts of said medium, treating the emulsion to remove the developed parts of said medium and the parts of the body in the immediate presence of the developed parts, and then exposing and developing an image in the emulsion.

9. The method of treating a photographic emulsion having a body carrying a light sensitive medium which includes printing onto one face of a photographic emulsion, developing the exposed parts, treating the emulsion to remove the developed parts of said medium and the body at the developed parts, then exposing and developing an image in the emulsion, coloring the developed parts of the emulsion, and then applying color to the elevated parts of said face.

10. The method which includes printing onto one face of a photographic emulsion, developing the exposed parts, treating the emulsion to remove the developed parts and all parts in their immediate presence, then exposing, developing, and coloring two images in the emulsion, one from each side, the coloring of the two images being different, and then applying color to the elevated parts of said face.

11. The method which includes printing onto one face of a photographic emulsion, developing the exposed parts, treating the emulsion to remove the developed parts and all parts in their immediate vicinity, dyeing the emulsion to make it a gradual filter, then exposing, developing, and coloring two images in the emulsion, one from each side, the coloring of the two images being different, and then applying color to the elevated parts of said face.

12. The method which includes printing onto one face of a photographic emulsion through a positive of a color value of a subject, developing the exposed parts, treating the emulsion to remove the developed parts and all parts in their immediate vicinity, and then exposing the emulsion through a negative of another color value of the subject, and then developing and fixing the last-mentioned exposure.

13. The method which includes exposing an emulsion from its inner side, developing the exposure, treating the developed exposure with a toning solution to make it susceptible to being colored without being further developed, exposing the emulsion from its outer side, and then treating the emulsion with a developing solution to develop the last mentioned exposure and to color the exposure at the inner side of the emulsion.

14. The method which includes exposing an emulsion from its inner side, developing the exposure, treating the developed exposure with a copper toning solution, exposing the emulsion from its outer side, developing the outer exposure with a ferrous oxalate developer, and then treating the emulsion with a solution containing an iron salt and sulphuric acid.

15. The method which includes making an exposure on the outer face of an emulsion, developing the exposed parts, treating the emulsion to remove the developed parts and all parts in their immediate vicinity, exposing the emulsion from its inner side, developing the last mentioned exposure, treating the developed exposure to make it susceptible to being colored without being further developed, exposing the emulsion from its outer side, then treating the emulsion to develop the exposure from the outer side of the emulsion and color the treated and developed exposure from the inner side of the emulsion, applying another color to the developed exposure from the outer side of the emulsion, and then applying another color to the elevated parts of the face of the emulsion.

16. The method which includes making an exposure on the outer face of an emulsion, developing the exposed parts, treating the emulsion to remove the developed parts and all parts in their immediate vicinity, dyeing the emulsion to make it a gradual filter, exposing the emulsion from its inner side, developing the last mentioned exposure, treating the developed exposure to make it susceptible to being colored without being further developed, exposing the emulsion from its outer side, then treating the emulsion to develop the exposure from the outer side of the emulsion and color the treated and developed exposure from the inner side of the emulsion, applying another color to the developed exposure from the outer side of the emulsion, and then applying another color to the elevated parts of the face of the emulsion.

17. The method which includes exposing an emulsion from its inner side, developing the exposure, treating the developed exposure with a copper toning solution, exposing the emulsion from its outer side, developing the outer exposure with a ferrous oxalate developer, and then treating the emulsion with an acidified solution containing an iron salt.

GEORGE E. BAXTER.